(12) United States Patent
Bubb et al.

(10) Patent No.: US 8,589,735 B2
(45) Date of Patent: Nov. 19, 2013

(54) CREATING RANDOMLY ORDERED FIELDS WHILE MAINTAINING THE TEMPORAL ORDERING BASED ON THE VALUE OF THE FIELDS

(75) Inventors: Clinton E. Bubb, Pleasant Valley, NY (US); Chaitanya Kancherla, Bangalore (IN); Roopesh A. Matayambath, Bangalore (IN); Ralf Winkelmann, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 247 days.

(21) Appl. No.: 13/108,398

(22) Filed: May 16, 2011

(65) Prior Publication Data

US 2012/0297250 A1 Nov. 22, 2012

(51) Int. Cl.
 *G06F 11/00* (2006.01)
(52) U.S. Cl.
 USPC .................................. 714/37; 714/50; 714/42
(58) Field of Classification Search
 USPC .......................................................... 714/37
 See application file for complete search history.

(56) References Cited

U.S. PATENT DOCUMENTS

| | | | |
|---|---|---|---|
| 5,299,196 A | | 3/1994 | Allen, Jr. |
| 5,758,051 A | * | 5/1998 | Moreno et al. .................... 714/2 |
| 5,864,654 A | * | 1/1999 | Marchant ........................... 714/3 |
| 6,076,128 A | | 6/2000 | Kamijo et al. |
| 7,587,396 B2 | | 9/2009 | Callaghan et al. |
| 2005/0108194 A1 | * | 5/2005 | Clifton .............................. 707/1 |
| 2005/0281469 A1 | | 12/2005 | Anderson et al. |
| 2010/0207789 A1 | | 8/2010 | Nieminen |
| 2012/0290870 A1 | * | 11/2012 | Shah et al. ................... 714/4.11 |

OTHER PUBLICATIONS

Mao, et al., Journal Title "IEICE Transactions on Fundamentals of Electronics, Communications and Computer Sciences", vol. E78-A, No. 9, pp. 1117-1126; Sep. 1995; Title: "MFSK/FH-CDMA System with Two-Stage Address Coding and Error Correcting Coding and Decoding".

* cited by examiner

*Primary Examiner* — Kamini Patel
(74) *Attorney, Agent, or Firm* — Cantor Colburn LLP; Steven Chiu

(57) ABSTRACT

A mechanism for verifying order of entities being processed by a device under test (DUT) is provided. The mechanism includes arranging the entities into a temporal order, and encoding the entities to maintain the temporal order of the entities and produce encoded entities with each being a random value. The encoded entities each have a one-to-one mapping to their corresponding one of the entities in the temporal order. The encoded entities are input into the DUT to verify its output, and responsive to detecting an error in the output corresponding to one encoded entity, the one encoded entity is decoded into a current decoded error entity. It is determined which is lower in the temporal order between the current decoded error entity and a previous decoded error entity. Responsive to the current decoded error entity being lower than the previous decoded error entity, the current decoded error entity is stored.

20 Claims, 7 Drawing Sheets

CREATING RANDOMLY ORDERED FIELDS WHILE MAINTAINING THE TEMPORAL ORDERING BASED ON THE VALUE OF THE FIELDS

BACKGROUND

Exemplary embodiments relate to communications, and more specifically, to creating randomly ordered fields while maintaining the temporal ordering.

In computer engineering, out-of-order execution is a paradigm used in most high-performance microprocessors (or any other hardware that may, e.g., be the device under test) to make use of instruction cycles that would otherwise be wasted by a certain type of costly delay. In this paradigm, a processor executes instructions in an order governed by the availability of input data, rather than by their original order in a program. In doing so, the processor can avoid being idle while data is retrieved for the next instruction in a program, processing instead the next instructions which is able to run immediately.

For in-order processors, the processing of instructions is normally done in these steps: 1) Instruction fetch. 2) If input operands are available (in registers for instance), the instruction is dispatched to the appropriate functional unit. If one or more operand is unavailable during the current clock cycle (generally because they are being fetched from memory), the processor stalls until they are available. 3) The instruction is executed by the appropriate functional unit. 4) The functional unit writes the results back to the register file.

For out-of-order processors, this paradigm breaks up the processing of instructions into these steps: 1) Instruction fetch. 2) Instruction dispatch to an instruction queue (also called instruction buffer or reservation stations). 3) The instruction waits in the queue until its input operands are available. The instruction is then allowed to leave the queue before earlier, older instructions. 4) The instruction is issued to the appropriate functional unit and executed by that unit. 5) The results are queued. 6) Only after all older instructions have their results written back to the register file, then this result is written back to the register file.

BRIEF SUMMARY

According to an exemplary embodiment, a method for verifying order of entities being processed by a device under test is provided. The method includes arranging the entities into a temporal order, and encoding the entities in which the encoding maintains the temporal order of the entities and produces encoded entities with each being a random value, where the encoded entities each have a one-to-one mapping to their corresponding one of the entities in the temporal order. The method includes inputting the encoded entities into the device under test to verify an output of the device under test, and responsive to detecting an error in the output corresponding to one encoded entity, decoding the one encoded entity into a current decoded error entity. Also, the method includes determining which is lower in the temporal order between the current decoded error entity and a previous decoded error entity, and responsive to the current decoded error entity being lower than the previous decoded error entity, storing the current decoded error entity.

According to an exemplary embodiment, a computer system configured to verify order of entities being processed by a device under test is provided. Memory is configured to store a program, and a processor is operatively connected to the memory and configured for arranging the entities into a temporal order. The processor is configured for encoding the entities in which the encoding maintains the temporal order of the entities and produces encoded entities with each being a random value, where the encoded entities each have a one-to-one mapping to their corresponding one of the entities in the temporal order. The processor is configured for inputting the encoded entities into the device under test to verify an output of the device under test, and responsive to detecting an error in the output corresponding to one encoded entity, decoding the one encoded entity into a current decoded error entity. Also, the processor is configured for determining which is lower in the temporal order between the current decoded error entity and a previous decoded error entity, and responsive to the current decoded error entity being lower than the previous decoded error entity, storing the current decoded error entity.

According to an exemplary embodiment, a computer program product for verifying order of entities being processed by a device under test is provided. The computer program product includes a computer readable storage medium having computer readable program code embodied therewith. The computer readable code is configured for arranging the entities into a temporal order, and encoding the entities in which the encoding maintains the temporal order of the entities and produces encoded entities with each being a random value, where the encoded entities each have a one-to-one mapping to their corresponding one of the entities in the temporal order. The computer readable code is configured for inputting the encoded entities into the device under test to verify an output of the device under test, and responsive to detecting an error in the output corresponding to one encoded entity, decoding the one encoded entity into a current decoded error entity. The computer readable code is configured for determining which is lower in the temporal order between the current decoded error entity and a previous decoded error entity, and responsive to the current decoded error entity being lower than the previous decoded error entity, storing the current decoded error entity.

Additional features are realized through the techniques of the present disclosure. Other systems, methods, apparatus, and/or computer program products according to other embodiments are described in detail herein and are considered a part of the claimed invention. For a better understanding of exemplary embodiments and features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification.

The foregoing and other features of the present disclosure are apparent from the following detailed description taken in conjunction with the accompanying drawings in which.

DETAILED DESCRIPTION

In many systems, entities of a particular type are processed. Those entities are often further specified by parameters. The way that entities are processed by the system usually depends on those parameters. Some of those systems are able to process entities out-of-order, but must be able to bring those entities in order again. Examples of those systems in computer hardware are transaction processing in input/output (I/O) and out-of-order processing cores. In the design of the hardware (e.g., device under test), additional functionality has to be designed and implemented to support the out-of-order property of the design. A common scheme is called tags. Tags are associated with entities in a way that an entity (A) that is in order left (or older) to entity (B) has a smaller tag value. Since resources in hardware design are finite, the cardinality of a tag is determined by the order of the number of bits for the tag. If a tag is represented by five bits in the design, then the system can distinguish among 32 tags in total. Entities are tracked along with their tag through the system, and a mechanism can be provided to compare order of entities. It should be noted that only a finite number of entities can be processed concurrently in the system at any point in time.

Unlike the verification of these conventional systems, an approach is provided that has the freedom of implementing the system behavior differently in a reference model according to an exemplary embodiment. Since the reference model exists in software, one is less constrained on resources and can choose other algorithms/concepts. This has at least two technical benefits: the implementation can become less complex; and implementation of the system's functionality in two different ways makes it less likely that the reference model comprises the same conceptual problems that the design (e.g., device under test) has. The following concept allows the present disclosure to treat/compute order of entities differently from tags.

Figure 1:
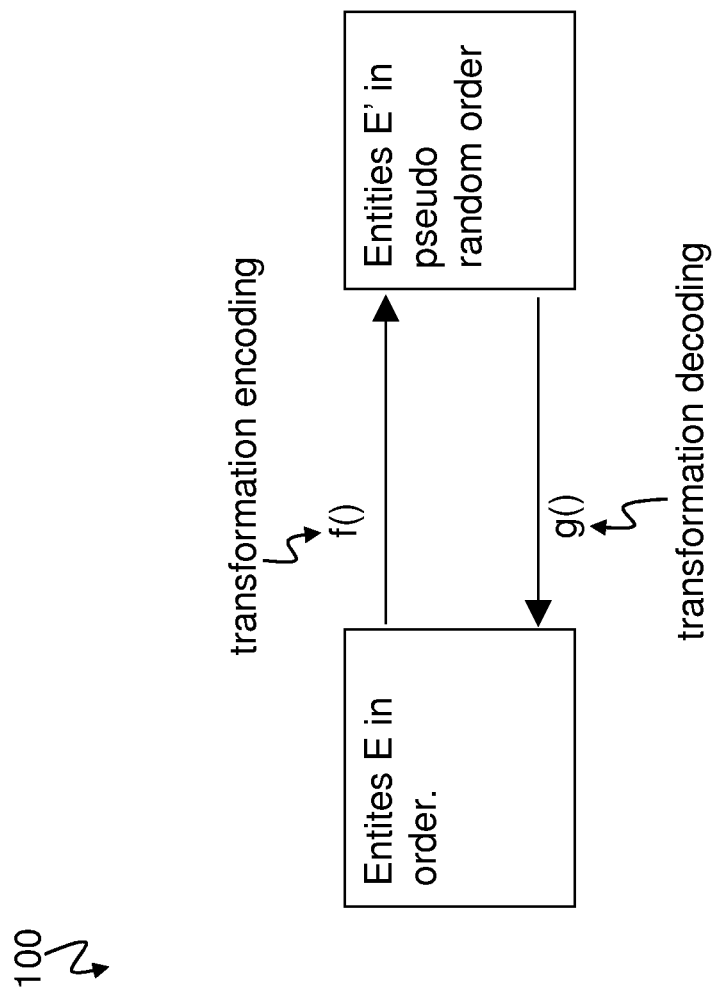
FIG. 1 depicts a diagram with transformation functions for a coding scheme according to an exemplary embodiment.

Now turning to the figures, FIG. 1 depicts diagram 100 with transformation functions for a coding scheme according to an exemplary embodiment. One transformation function is for encoding entities and the other transformation function is for decoding entities.

Assume that the transformation functions can compute entities in a manner that every entity is different from the other and order between two entities can be computed by just comparing the value of both entities. Furthermore, assume that there is a transformation function e'=f(e) that transforms (encodes) entities e into e' and that a transformation function e=g(e') decodes the decoded entities into their original value/form. Both transformations must have certain characteristics. For example, the transformation function e'=f(e) results in a pseudo random value for e' (i.e., encoded entity). Thus, any two different e' (decoded entities) can no longer be brought back in order by comparing their value (encoded value). However, a simple (i.e., not computation intensive) and inexpensive (e.g., little cost in time) transformation function e=g(e') can be performed followed by a comparison of the transformed values (the decoded entity values) according to an exemplary embodiment. Each entity has a one-to-one mapping to its encoded entity (also referred to as transformed entity) after transformation by the encoding function f( ).

One example of the coding scheme for the encoding transformation function f( ) is subtracting 'F' from all the nibbles. For example, if the nibble is 4 after applying the coding scheme (transformation encoding), the nibble will become 5 after subtracting F. Another example for the encoding transformation function f( ) is to reverse the bits in each byte, e.g., for a given hexadecimal number. So the hexadecimal number '12345678'X becomes '482C6A1E'X after the encoding transformation. In a further example, the encoding function f( ) is to reverse a particular bit (such as the $4^{th}$ bit) in each byte, e.g., for a given hexadecimal number. In these examples, the decoding transformation function go is the inverse operation of the transformation function f( ) to return back to the original entity (i.e., the decoded entity).

The above described transformation encoding and decoding scheme can be applied in various applications.

Figure 2:
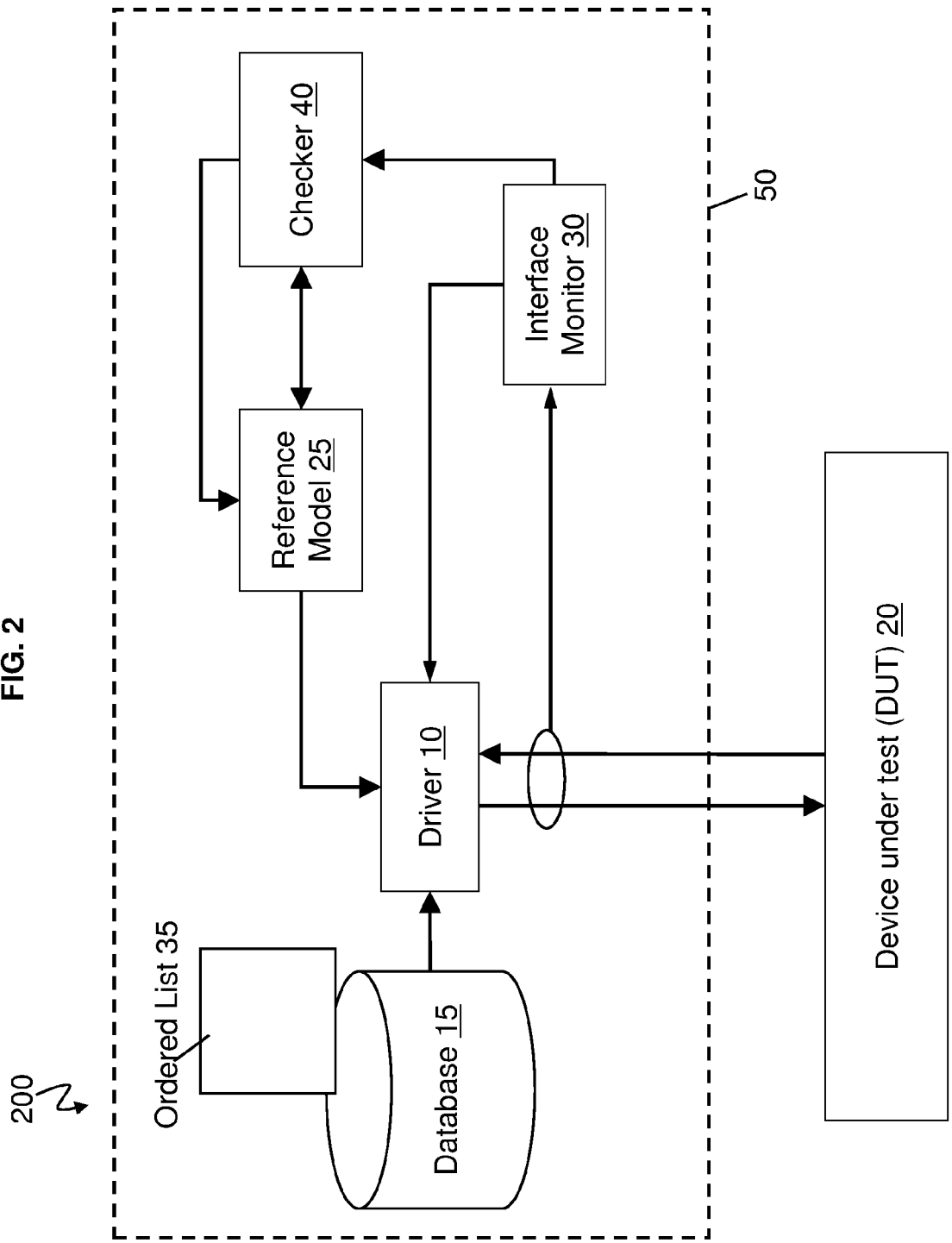
FIG. 2 depicts a verification environment according to an exemplary embodiment.

FIG. 2 depicts a verification environment 200 according to an exemplary embodiment. A driver 10 is configured to retrieve data (which may include constraints and testcases) from a database 15. The driver 10 generates commands to input to a device under test (DUT) 20 (e.g., also referred to as a design under verification (DUV).

Each command generated by the driver 10 may be considered an entity (e). A reference model 25 is utilized by the driver 10 to generate the commands for the input to the device under test 20, and the device under test 20 executes and/or processes each command from driver 10. The driver 10 is configured to arrange all of the entities (i.e., commands) in temporal ordering in a list 35. The driver 10 is configured to apply the transformation encoding function e'=f(e) on each of the entities in the list 35 which produces encoded entities that are random. The driver 10 inputs the encoded entities (i.e., encoded commands) to the device under test 20.

The device under test 20 outputs results (e.g., a destination command for each input command) back to the driver 10. An interface monitor 30 is configured to monitor the communication between the driver 10 and the device under test 20. For example, the interface monitor 30 can monitor the input commands (encoded entities) sent from the driver 10 and the output results sent from the device under test 20. The interface monitor 30 provides the input commands and output results to a checker 40. By utilizing the reference model 25, the checker 40 computes the output results from the device under test 20 in advance. The checker 40 checks the computed results against the output results of the device under test 20 and determines if the device under test 20 properly processes the input commands (encoded entities). Also, after the driver 10 decodes the encoded entities, the checker 40 can compare any decoded entity to a previous decoded entity to determine which comes first (smaller) according to the temporal order in the list 35.

Figure 7:
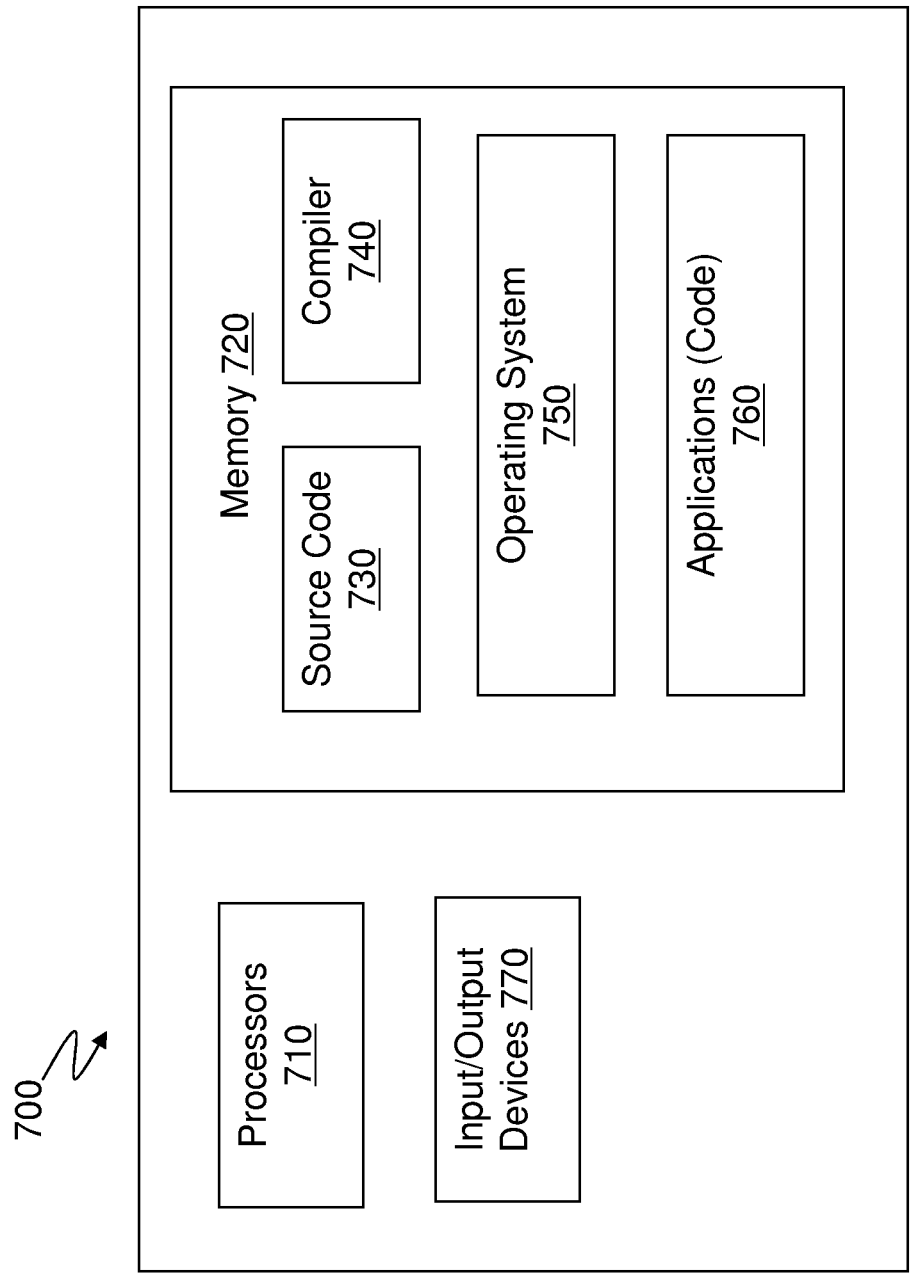
FIG. 7 depicts a computing system having features that may be utilized according to an exemplary embodiment.

The elements in box 50 may be implemented in one or more software applications (cooperatively) operating in one or more computing systems (such as the computing system 700 shown in FIG. 7). The device under test 20 is hardware, such as a processor, a processor core, a chip, a computing system (e.g., a server, router, and the like), etc., undergoing testing in the verification environment 200. Although various scenarios will be discussed below for explanation purposes, it is understood that exemplary embodiments are not meant to be limited.

Consider the following out of order scenario. For a chip (e.g., such as the device under test 20) which acts as a bridge between two different buses, the input commands coming from one bus gets address translated to the output commands on the other bus. One way of doing address translation is by using a scattered gathered list where this list will have many segments, and the address and count in each segment is used for translating the commands on one side of the bus to other side. An example of this type of translation would be any use of a generic direct memory access (DMA) engine. Here, the bus from which the commands come in is specified as source side and the bus where the commands get address translated is specified as destination side. If the commands on the destination side results in any kind of error, an error acknowledgement with error is sent to the source (originator) side. Along with the error acknowledgement, a failing address (error address) is also sent. Failing address (error address) information is logged inside the chip (hardware) which can be read from outside, and the commands can be repeated from the point where the failure (error) happened. One feature using this technique is the failing address, because it is easy to calculate the point from where the commands have to start again on the originator bus. Note that the command error acknowledgment from the destination side may return out of order, and in that case, the error address logged by the chip should be the error address corresponding to the command which comes earlier the in the segment list.

Figure 3:
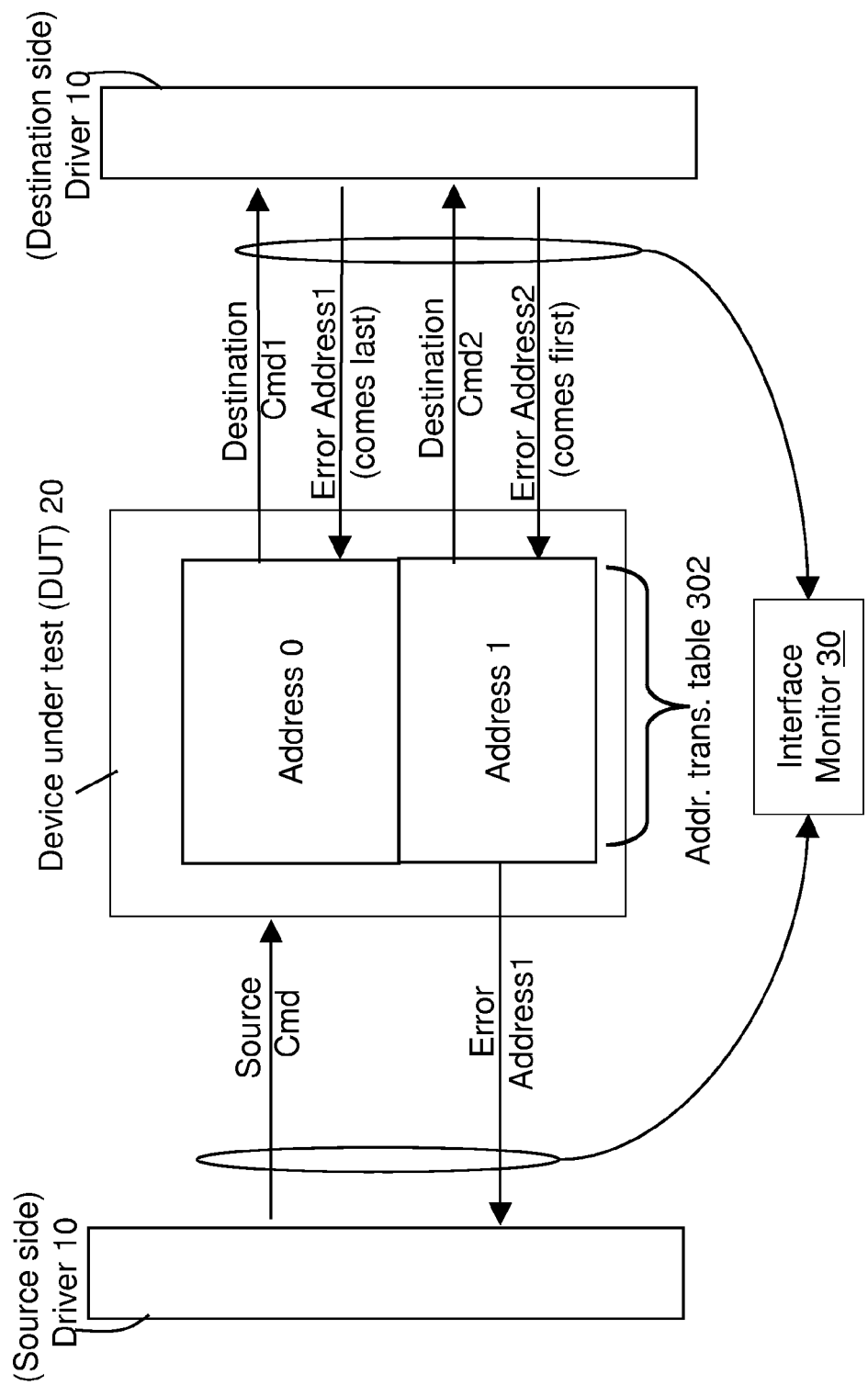
FIG. 3 depicts a scenario for a verification environment according to an exemplary embodiment.

FIG. 3 depicts an implementation of the verification environment 200 for testing out of order error response according to an exemplary embodiment. In FIG. 3, the driver 10 is shown on both sides of the device under test 20 to represent a source side and a destination side. Also, for the sake of clarity in FIG. 3 (and in FIG. 4), the database 15, the reference model 25, the list 35, and the checker 40 may not shown but are understood to be part of the verification environment 200.

In this out of order error response scenario, assume that command 1 and command 2 on the destination side of the device under test 20 results in an error and the error acknowledgement for command 2 comes earlier (from the device 10) than the error acknowledgement for command 1. Since command 1 corresponds to an earlier segment address an address translation table 302 than command 2, the device under test 20 (hardware) should log the error address for command 1. As will be discussed further herein with reference to FIG. 5, the approach determines how to decide whether error address 1 or error address 2 (which appear as random values) should be logged when error address 2 comes first (out of order) and error address 1 comes last.

Figure 4:
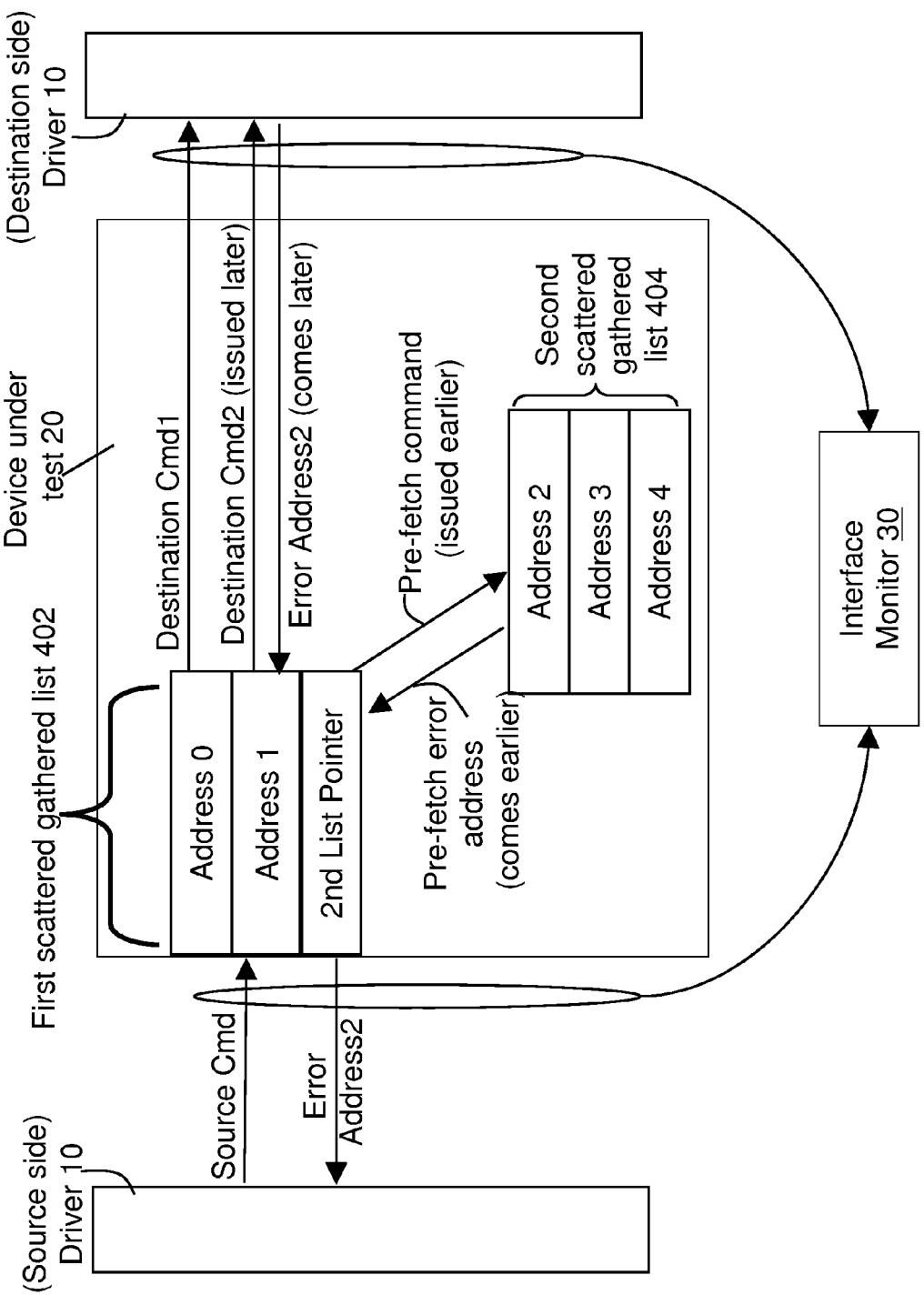
FIG. 4 depicts a scenario for a verification environment according to an exemplary embodiment.

Now turning to FIG. 4, there is an implementation of the verification environment 200 according to an exemplary embodiment. FIG. 4 illustrates a pre-fetch scenario in which in some cases a first scattered gathered list 402 may have the last segment on the first scattered gathered list 402 as a pointer to the second (next) scattered gathered list 404 in the device under test 20. In this case, the device under test 20 (hardware) may pre-fetch the second scattered gathered list 404 before issuing all the commands corresponding to the first scattered gathered list 402. This may happen in such a way that the pre-fetch command (to the second scattered gathered list 404) can have high priority, and the response (e.g., pre-fetch error address) to the pre-fetch command can come back sooner than the response (e.g., error address 2) corresponding to the commands in the first scattered gathered list 404. Here, if both the pre-fetch command for the second scattered gathered list 404 and the regular command in the first scattered gathered list 402 end up in error, the device under test 20 (hardware) has to log the error address corresponding to the regular command (e.g., error address 2) of the first scattered gathered list 402 because error address (error address 2) corresponding to the regular command has an earlier error in the first (segment) scattered gathered list 402.

To verify that the device under test 20 produced the correct results and to determine the correct error address (for the scenarios shown in FIGS. 3 and 4), one conventional technique to make sure the logic logs the correct error address is to look through the scattered gathered list (e.g., the first scattered gathered list 402 and the second scattered gathered list 404) once the error happens and verify the position of the command in the scattered gathered list. However, if the scattered gathered list is very big and if there are many scattered gathered lists, this process can be very cumbersome and computation intensive. Another conventional technique is, when the error happens, look at the time at which the command was issued and log the error address corresponding to the command. However, as described above in FIG. 4, the pre-fetch command gets issued before the regular command, and if both the pre-fetch command and the regular command (e.g., destination command 2) end up with errors, the error corresponding to the regular command (error address 2) has to be logged (not the pre-fetch error address) because the regular command was in the first scattered gathered (segment) list 402 that comes earlier than the second scattered gathered list 404.

Figure 5:
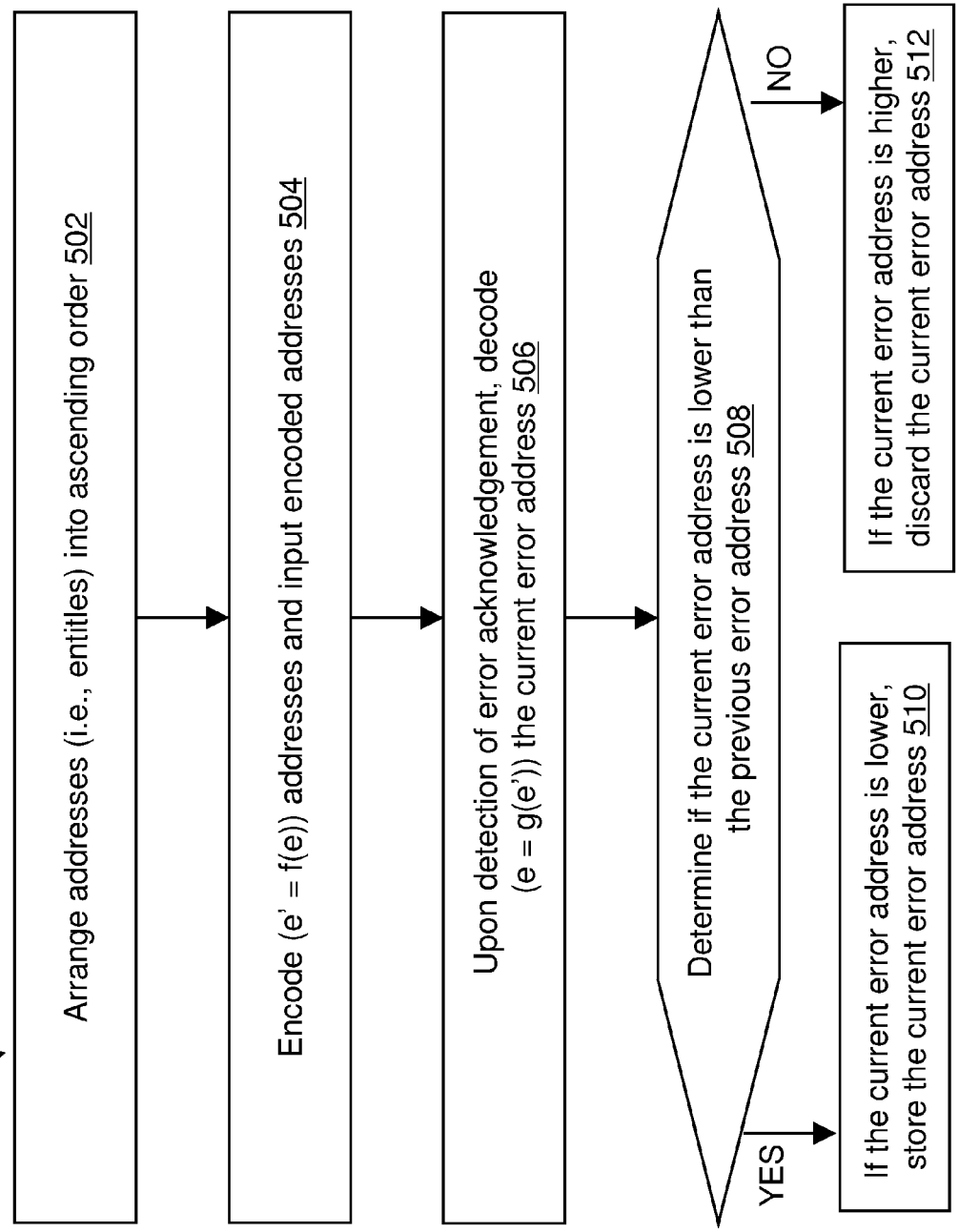
FIG. 5 illustrates a method to encode and decode entities while maintaining a temporal order of the entities according to an exemplary embodiment.
Figure 6:
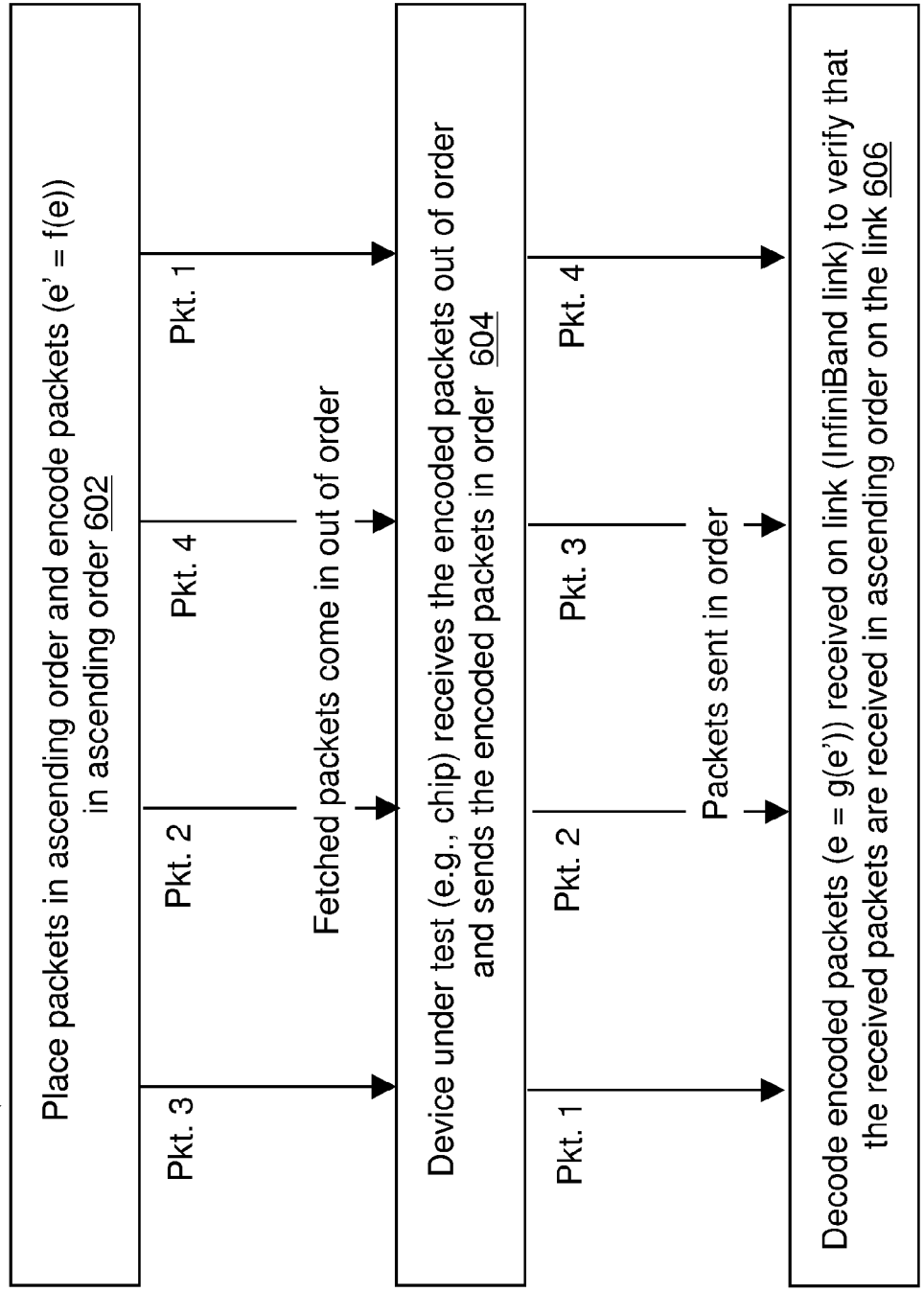
FIG. 6 depicts a diagram to encode and decode packets while maintaining a temporal order of the packets according to an exemplary embodiment.

According to an exemplary embodiment, FIG. 5 illustrates a method 500 to encode and decode entities (e.g., such as addresses) while maintaining a temporal order of the entities for the scenarios discussed in FIGS. 3 and 4 (along with other scenarios). The method 500 (along with FIG. 6) is executed by the software application 50 (which may include, implement, and/or utilize the functionality of the elements 10, 15, 25, 30, 35, 40) as would be understood by one skilled in the art.

Initially, the software application 50 is configured to set up (i.e., arrange) the addresses (i.e., entities) in the list 35 in ascending order for all the segments and the list may be stored in the database 15 (block 502). The segments may be the placeholders, boxes, data structures, tables, and/or storage locations in the address translation table 302, and/or the first and second scattered gathered lists 402, 404. However, purely ascending order addresses in the list 35 will reduce the randomness of the test to the device under test 20. For example, device under test 20 is being tested with random entities to determine/verify if the device under test 20 can properly process the random entities. When a failure/error occurs, the verification environment 200 needs to determine at what point during processing the random input entities did the error occur, by determining the corresponding error address.

Accordingly, the software application 50 is configured to pick up the addresses (i.e., entities) in the ascending order in the list 35 but before placing the address in segments (for the address translation table 302 and/or the first and second scattered gathered lists 402, 404), the software application 50 is configured to encode the addresses in the list 35 by using the encoding transformation function (e'=f(e)) so that the now encoded addresses (i.e., encoded entities) will appear to hardware (e.g., the device under test 20) as random encoded addresses (i.e., random encoded entities) when input (block 504). Although each encoded address now appears as a random encoded address when input into the device under test 20 (by the driver 10), the encoded addresses still maintain their temporal ordering such that decoding the encoded addresses automatically reveals where in the ascending order in the list 35 the decoded address falls. After encoding the entities (e.g., addresses), the software application 50 is configured to build/set up the address translation table 302 in FIG. 3 and the first and second scattered gathered lists 402, 404 in FIG. 4.

The device under test 20 processes the received encoded addresses as random addresses, and outputs destination commands (which may contain and/or correspond to an encoded error address). Error acknowledgment is sent by the driver 10

(on the destination side). Upon detection of an error acknowledgement (for a destination command) by the software application 50, the software application 50 is configured to decode (e=g(e')) the current encoded error address (block 506). For example, when the encoded error address comes back from the destination side of the device under test 20, software application 50 applies the inverse transformation decoding function e=g(e'), and the software application 50 is configured to validate the order of decoded error addresses by checking that the current decoded error address is smaller than the previous decoded error address in the list 35 (block 508). A decoded error address is the same (value) as the regular address before encoding. This allows the software application 50 to then predict that this current decoded error address is the address that the device under test 20 (hardware) has to log when the current decoded error address is smaller than the previous decoded error address (block 510); otherwise, the current error address is discarded and the previous decoded error address corresponds to this particular error acknowledgement (block 512).

In the method 500, the software application 50 in the verification environment 200 can avoid the cumbersome process of browsing through all segments in (the address translation table 302 and/or the first and second scattered gathered lists 402, 404) and also avoid the ambiguity in accounting for (deciphering) the pre-fetch error address for high priority pre-fetch commands. Upon detecting an error address, the verification code of the software application 50 (only) needs to compare this current decoded error address with the previous decoded error address; if the current decoded error address is smaller (e.g., according to an ascending order, e.g., 1, 2, 3, 4 . . . N) in the list 35 (or vice versa), the software application 50 is configured to store this current decoded error address as the new error address. Otherwise, the software application 50 ignores this current decoded error address.

As mentioned above, the decoded error address and the (original) address are the same value. Also, each entity has a value and the corresponding encoded entity has a different value. A plurality of entities (each with an original value) in the temporal order of the list 35 is encoded into a plurality of encoded entities (each with a random encoded value) for input into the device under test 20. After decoding any of the encoded entities into decoded entities (having their original values), the software application 50 is configured to compare, e.g., the current decoded entity (having its original value) to the previous decoded entity (having its original value). From this comparison, whichever decoded entity (i.e., value) is evaluated to be smaller and/or come earlier in the list 35, this decoded entity is determined to be the correct decoded entity for storing.

Now, consider a scenario in which a chip (e.g., device under test 20) is fetching data from host memory, and the fetched data packets return from the host memory out of order. But when the data progresses out the other side of the chip (to, e.g., an InfiniBand® link), verification code must check that packets are now received in order from the chip. According to an exemplary embodiment, the method 500 discussed herein can apply as depicted in diagram 600 of FIG. 6. The software application 50 is configured to store the packets (e.g., entities) in the host memory in ascending order (such as the packets 1, 2, 3, and 4, for example) in the list 35, and after applying the transformation encoding e'=f(e) (by the software application 50), the encoded packets (encoded entities) appear to be random in nature in the host memory (block 602).

The device under test 20 (e.g., chip) can fetch/receive the encoded packets (in a random order) out of order from the host memory and send the encoded packets out on a link (e.g., InfiniBand® link) in order (block 604). The device under test 20 is designed to arrange the encoded packets received out of order, so that the encoded packets can be output from the device under test 20 in order. When the encoded packets are sent out on the link, the software application 50 receives the encoded packets and applies the (reverse) transformation decoding e=g(e'); and via inspection of the decoded packets (i.e., original packets), the software application 50 can determine the integrity (i.e., ascending order or descending order) of the decoded packets by checking the received order of the decoded packets against the ascending order in the list 35 (block 606). As such, the software application 50 can determine if the decoded packets received on the link are sent in order from the device under test 20.

This approach is not limited to the scenarios discussed herein. This approach can also be used for general electronic design automation (EDA) applications where there are requirements to create randomly ordered fields (addresses, etc) while still being able to recognize the temporal ordering based on the field itself.

Further, unlike conventional systems, the approach discussed herein does not require tags (i.e., additional information) to be placed on and/or sent along with the entity itself, because the encoding is on the entity (i.e., address, packet, data, field, etc.) itself. Then, decoding the entity reveals the temporal order (ascending and/or descending) of the entities relative to other entities against the temporal ordering list 35 (e.g., from lowest to highest values, least to greatest values, left to right, youngest to oldest, and/or the reverse) prepared in advance. Also, the transformation encoding automatically creates random encoded entities out of the ordered entities listed in the temporal ordering list 35.

FIG. 7 illustrates an example of a computer system 700 having capabilities, which may be included in exemplary embodiments. Various methods, procedures, modules, flow diagrams, tools, application, and techniques discussed herein may also incorporate and/or utilize the capabilities of the computer system 700. Moreover, capabilities of the computer system 700 may be utilized to implement features of exemplary embodiments discussed herein including with reference to FIGS. 1-6. One or more of the capabilities of one or more of the computer systems 700 may implement any element discussed herein such as but not limited to the elements 10, 15, 25, 30, 35, 40, 50, etc. Also, when the software application 50 is implemented in the computing system 700, the computer system 700 includes the necessary cables, wires, and connections to operatively connect to and communicate with the device under test 20.

Generally, in terms of hardware architecture, the computer system 700 may include one or more processors 710, computer readable storage memory 720, and one or more input and/or output (I/O) devices 770 that are communicatively connected via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 710 is a hardware device for executing software that can be stored in the computer readable storage memory 720. The processor 710 can be virtually any custom made or commercially available processor, a central processing unit (CPU), a data signal processor (DSP), or an auxiliary processor among several processors associated with the computer 700.

The computer readable storage memory 720 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the computer readable storage memory 720 may incorporate electronic, magnetic, optical, and/or other types of storage media. Note that the computer readable storage memory 720 can have a distributed architecture, where various components are situated remote from one another, but can be accessed by the processor 710.

The software in the computer readable storage memory 720 may include one or more separate programs, each of which comprises an ordered listing of executable instructions for implementing logical functions. The software in the computer readable storage memory 720 includes a suitable operating system (O/S) 750, compiler 740, source code 730, and one or more applications 760 of the exemplary embodiments. As illustrated, the application 760 comprises numerous functional components for implementing the features, processes, methods, functions, and operations of the exemplary embodiments. Further, the application 760 may be a source program, executable program (object code), script, or any other entity comprising a set of instructions to be performed.

The I/O devices 770 may include input devices (or peripherals) such as, for example but not limited to, a mouse, keyboard, scanner, microphone, camera, etc. Furthermore, the I/O devices 770 may also include output devices (or peripherals), for example but not limited to, a printer, display, etc. Finally, the I/O devices 770 may further include devices that communicate both inputs and outputs, for instance but not limited to, a NIC or modulator/demodulator (for accessing remote devices, other files, devices, systems, or a network), a radio frequency (RF) or other transceiver (tower), a telephonic interface, a bridge, a router, etc. The I/O devices 770 also include components for communicating over various networks, such as the Internet or an intranet. The I/O devices 770 may be connected to and/or communicate with the processor 710 utilizing Bluetooth connections and cables (via, e.g., Universal Serial Bus (USB) ports, serial ports, parallel ports, fiber optics, FireWire, HDMI (High-Definition Multimedia Interface), etc.).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the exemplary embodiments of the invention have been described, it will be understood that those skilled in the art, both now and in the future, may make various improvements and enhancements which fall within the scope of the claims which follow. These claims should be construed to maintain the proper protection for the invention first described.

What is claimed is:

1. A method for verifying order of entities being processed by a device under test, the method comprising:
arranging the entities into a temporal order;
encoding the entities in which the encoding maintains the temporal order of the entities and produces encoded entities with each being a random value, the encoded entities each have a one-to-one mapping to their corresponding one of the entities in the temporal order;
inputting the encoded entities into the device under test to verify an output of the device under test;
responsive to detecting an error in the output corresponding to one encoded entity, decoding the one encoded entity into a current decoded error entity;
determining which is lower in the temporal order between the current decoded error entity and a previous decoded error entity; and
responsive to the current decoded error entity being lower than the previous decoded error entity, storing the current decoded error entity.

2. The method of claim 1, wherein the current decoded error entity is an address.

3. The method of claim 1, wherein the current decoded error entity is a packet.

4. The method of claim 1, wherein each of the entities are addresses that are encoded by the encoding into a plurality of random values to be input into the device under test.

5. The method of claim 1, wherein arranging the entities into the temporal order comprises arranging the entities in ascending order in a list.

6. The method of claim 1, wherein arranging the entities into the temporal order comprises arranging the entities in descending order in a list.

7. The method of claim 1, wherein the current decoded error entity has a first value in the temporal order and the previous decoded error entity has a second value in the temporal order; and
wherein the current decoded error entity is stored responsive to the first value being lower than the second value in the temporal order.

8. The method of claim 1, wherein the current decoded error entity is error acknowledged after the previous decoded error entity is error acknowledged;
wherein the current decoded error entity corresponds to an earlier destination command from the device under test than the previous decoded error entity; and
wherein the current decoded error entity is determined to be correct based on a value of the current decoded error entity being lower in the temporal order than a value of the previous decoded error entity.

9. A computer system configured to verify order of entities being processed by a device under test, comprising:
memory configured to store a program, and a processor operatively connected to the memory and configured for:

arranging the entities into a temporal order;
encoding the entities in which the encoding maintains the temporal order of the entities and produces encoded entities with each being a random value, the encoded entities each have a one-to-one mapping to their corresponding one of the entities in the temporal order;
inputting the encoded entities into the device under test to verify an output of the device under test;
responsive to detecting an error in the output corresponding to one encoded entity, decoding the one encoded entity into a current decoded error entity;
determining which is lower in the temporal order between the current decoded error entity and a previous decoded error entity; and
responsive to the current decoded error entity being lower than the previous decoded error entity, storing the current decoded error entity.

10. The computer system of claim 9, wherein the current decoded error entity is an address.

11. The computer system of claim 9, wherein the current decoded error entity is a packet.

12. The computer system of claim 9, wherein each of the entities are addresses that are encoded by the encoding into a plurality of random values to be input into the device under test.

13. The computer system of claim 9, wherein arranging the entities into the temporal order comprises arranging the entities in ascending order in a list.

14. The computer system of claim 9, wherein arranging the entities into the temporal order comprises arranging the entities in descending order in a list.

15. The computer system of claim 9, wherein the current decoded error entity has a first value in the temporal order and the previous decoded error entity has a second value in the temporal order; and
wherein the current decoded error entity is stored responsive to the first value being lower than the second value in the temporal order.

16. The computer system of claim 9, wherein the current decoded error entity is error acknowledged after the previous decoded error entity is error acknowledged;
wherein the current decoded error entity corresponds to an earlier destination command from the device under test than the previous decoded error entity; and
wherein the current decoded error entity is determined to be correct based on a value of the current decoded error entity being lower in the temporal order than a value of the previous decoded error entity.

17. A computer program product for verifying order of entities being processed by a device under test, the computer program product comprising:
a non-transitory computer readable storage medium having computer readable program code embodied therewith, the computer readable code configured for:
arranging the entities into a temporal order;
encoding the entities in which the encoding maintains the temporal order of the entities and produces encoded entities with each being a random value, the encoded entities each have a one-to-one mapping to their corresponding one of the entities in the temporal order;
inputting the encoded entities into the device under test to verify an output of the device under test;
responsive to detecting an error in the output corresponding to one encoded entity, decoding the one encoded entity into a current decoded error entity;
determining which is lower in the temporal order between the current decoded error entity and a previous decoded error entity; and
responsive to the current decoded error entity being lower than the previous decoded error entity, storing the current decoded error entity.

18. The computer program product of claim 17, wherein the current decoded error entity is an address.

19. The computer program product of claim 17, wherein the current decoded error entity is a packet.

20. The computer program product of claim 17, wherein each of the entities are addresses that are encoded by the encoding into a plurality of random values to be input into the device under test.

* * * * *